(12) United States Patent
Okawa et al.

(10) Patent No.: US 11,762,679 B2
(45) Date of Patent: Sep. 19, 2023

(54) INFORMATION PROCESSING DEVICE, INFORMATION PROCESSING METHOD, AND NON-TRANSITORY COMPUTER-READABLE STORAGE MEDIUM

(71) Applicant: OMRON Corporation, Kyoto (JP)

(72) Inventors: Yohei Okawa, Koshigaya (JP); Yoshiya Shibata, Tokyo (JP); Chisato Saito, Tokyo (JP); Kennosuke Hayashi, Tokyo (JP); Yu Tomono, Tokyo (JP)

(73) Assignee: OMRON Corporation, Kyoto (JP)

( * ) Notice: Subject to any disclaimer, the term of this patent is extended or adjusted under 35 U.S.C. 154(b) by 628 days.

(21) Appl. No.: 16/978,707

(22) PCT Filed: Mar. 1, 2019

(86) PCT No.: PCT/JP2019/007994
§ 371 (c)(1),
(2) Date: Sep. 6, 2020

(87) PCT Pub. No.: WO2019/172101
PCT Pub. Date: Sep. 12, 2019

(65) Prior Publication Data
US 2021/0049033 A1    Feb. 18, 2021

(30) Foreign Application Priority Data
Mar. 6, 2018   (JP) .................. 2018-040115

(51) Int. Cl.
*G06F 9/455*   (2018.01)
*G06N 20/00*   (2019.01)
*G06N 7/01*   (2023.01)

(52) U.S. Cl.
CPC ........... *G06F 9/45558* (2013.01); *G06N 7/01* (2023.01); *G06N 20/00* (2019.01);
(Continued)

(58) Field of Classification Search
CPC ......... G06F 9/45558; G06F 2009/4557; G06F 2009/45575; G06F 2009/45595;
(Continued)

(56) References Cited

U.S. PATENT DOCUMENTS

2017/0124448 A1* 5/2017 Engel .................. G06F 11/00
2017/0213156 A1   7/2017 Hammond et al.
(Continued)

FOREIGN PATENT DOCUMENTS

| CN | 102184406 | 9/2011 |
| CN | 106393101 | 2/2017 |

(Continued)

OTHER PUBLICATIONS

James, Stephen et al., "Transferring End-to-End Visuomotor Control from Simulation to Real World for a Multi-Stage Task", Conference on Robot Learning (CoRL 2017), Oct. 17, 2017, pp. 1-11.

(Continued)

*Primary Examiner* — Sisley N Kim
(74) *Attorney, Agent, or Firm* — JCIPRNET

(57) ABSTRACT

The image processing device is provided with: a first input unit which, with respect to one or more virtual models including a virtual model of an operation machine, receives an input of a first parameter for identifying a type; a second input unit which receives an input of a second parameter relating to a stochastic distribution having, as a random variable, a characteristic of an element constituting the one or more virtual models; a virtual model generation unit which, using the first parameter and the second parameter, generates the one or more virtual model stochastically; a determination unit which determines the correctness of an operation of the virtual model of the operation machine when operated in a virtual space including the one or more (Continued)

stochastically generated virtual models; and a learning unit which learns a control module for the operation machine for achieving a predetermined operation.

14 Claims, 9 Drawing Sheets

(52) U.S. Cl.
CPC ............... *G06F 2009/4557* (2013.01); *G06F 2009/45575* (2013.01); *G06F 2009/45595* (2013.01)

(58) Field of Classification Search
CPC .......... G06N 7/01; G06N 20/00; G06N 3/006; G06N 3/08; G05B 2219/25255; G05B 19/0426
See application file for complete search history.

(56) References Cited

U.S. PATENT DOCUMENTS

| | | |
|---|---|---|
| 2017/0270433 A1 | 9/2017 | Tsubouchi et al. |
| 2018/0018587 A1* | 1/2018 | Kobayashi ............. G06N 20/00 |

FOREIGN PATENT DOCUMENTS

| | | |
|---|---|---|
| CN | 106873550 | 6/2017 |
| CN | 107000223 | 8/2017 |
| CN | 107179870 | 9/2017 |
| JP | 2016218869 | 12/2016 |
| JP | 2017102755 | 6/2017 |
| JP | 2017213644 | 12/2017 |
| JP | 2018190241 | 11/2018 |
| TW | 200302408 | 8/2003 |
| WO | 2017163538 | 9/2017 |

OTHER PUBLICATIONS

Tobin, Josh et al., "Domain Randomization for Transferring Deep Neural Networks from Simulation to the Real World", 2017 IEEE/RSJ International Conference on Intelligent Robots and Systems (IROS), Sep. 24, 2017, pp. 1-9.

"International Search Report (Form PCT/ISA/210) of PCT/JP2019/007994", dated Apr. 23, 2019, pp. 1-4.

"Written Opinion of the International Searching Authority (Form PCT/ISA/237) of PCT/JP2019/007994", dated Apr. 23, 2019, pp. 1-6.

"Office Action of Japan Counterpart Application" with English translation thereof, dated Jul. 1, 2021, p. 1-p. 4.

C Jiang et al., "Automatic Modeling and Simulation of Modular Robots," IOP Conference Series: Materials Science and Engineering, vol. 320, Mar. 2018, pp. 1-8.

Esther Luna Colombini et al., "A Framework for Learning in Humanoid Simulated Robots," Lecture Notes in Computer Science, Jul. 2008, pp. 345-352.

Jeremy A. Marvel et al., "Internal model generation for evolutionary acceleration of automated robotic assembly optimization," Proceedings of the 9th Workshop on Performance Metrics for Intelligent Systems, Sep. 2009, pp. 9-15.

"Search Report of Europe Counterpart Application", dated Apr. 11, 2022, p. 1-p. 11.

"Office Action of China Counterpart Application", dated May 17, 2023, with English translation thereof, p. 1-p. 33.

Yong Song, "Research on Mathematical Modeling and Quantitative Analysis of Robots Collective Behaviors," Doctoral Dissertation Full-text Database (Information Technology Series), School of Control Science and Engineering, Shandong University, May 2023, pp. 1-5.

* cited by examiner

INFORMATION PROCESSING DEVICE, INFORMATION PROCESSING METHOD, AND NON-TRANSITORY COMPUTER-READABLE STORAGE MEDIUM

CROSS-REFERENCE TO RELATED APPLICATION

This application is a 371 application of the International PCT application serial no. PCT/JP2019/007994, filed on Mar. 1, 2019, which claims the priority benefits of Japan Patent Application No. 2018-040115, filed on Mar. 6, 2018. The entirety of each of the above-mentioned patent applications is hereby incorporated by reference herein and made a part of this specification.

TECHNICAL FIELD

The present invention relates to an information processing device, an information processing method, and a program.

BACKGROUND ART

In recent years, it has been proposed that an operating machine such as, for example, an industrial robot autonomously obtains a control module using machine learning such as supervised learning or reinforcement learning, for example. However, to obtain a control module using a real machine of the operating machine, the real machine needs to be operated as many times as the number of times learning is performed, which is thus very time consuming.

Accordingly, as a method with reduced learning time, it is also conceivable to arrange, in a virtual space, virtual models that are equivalent to an operating machine, a work object, a sensor for observing an operation, an operation environment, and the like, and then generate, by learning, a control module of the operating machine in the virtual space based on simulation using the virtual models. However, in a real environment, variation occurs in, for example, individual components such as robot arms and the position at which the sensor is provided, but such variation does not typically occur in the virtual models, and thus the control module obtained through learning with a simulator using the virtual models is not sufficiently robust when it is applied in a real environment.

As an example of a technique for dealing with various situations of a real environment when a control module of a robot arm is obtained through learning of a simulator, a method for performing learning by randomly selecting colors of virtual models of a robot and a work object, positions of a camera and a light source, textures of a wall surface and a table, and the like is disclosed in Non-Patent Literature 1.

CITATION LIST

Non-Patent Literature

NON-PATENT LITERATURE 1: Stephen James and two others, "Transferring End-to-End Visuomotor Control from Simulation to Real World for a Multi-Stage Task", United States, 1st Conference on Robot Learning (CoRL 2017), Jul. 7, 2017 is an example of background art.

SUMMARY OF INVENTION

Technical Problem

However, if learning is performed by randomly generating virtual models as in the method disclosed in Stephen James and two others, "Transferring End-to-End Visuomotor Control from Simulation to Real World for a Multi-Stage Task", actually impossible virtual models will also be learned, and thus learning efficiency is deteriorated. On the other hand, if only actually possible virtual models are learned, there will be the problem that an obtained control module cannot be applied to an unlearned and unknown situation.

Aspects of the present invention were made in view of the above-described problems, and it is an object thereof to provide an information processing device, an information processing method, and a program that allow appropriately obtaining a control module of an operating machine.

Solution to Problem

According to one aspect of the present invention, a first input unit configured to receive an input of a first parameter for specifying a type of at least one virtual model including a virtual model of an operating machine; a second input unit configured to receive an input of a second parameter relating to a probability distribution with random variables set for a characteristic of a constituent component of the at least one virtual model; a virtual model generation unit configured to stochastically generate the at least one virtual model based on the first parameter and the second parameter; a determination unit configured to determine, when the virtual model of the operating machine is operated in a virtual space that includes the at least one virtual model that is stochastically generated, whether the operation is successful or failed; and a learning unit configured to generate by learning, based on a success/failure determination result of the operation, a control module for the operating machine to realize a predetermined operation.

According to this configuration, upon input of a second parameter that defines a probability distribution with random variables set for a characteristic of a constituent component of a virtual model, a control module generated by learning using the virtual model that includes the constituent component having the characteristic with variation based on the second parameter. Accordingly, it is possible to generate a control module robust against variation that may occur in a real environment.

Furthermore, since the control module is generated in the virtual environment, it takes only calculation time to obtain the control module. Accordingly, it is possible to obtain the control module of the operating machine within a shorter time period than in a case where learning data is generated in a real environment.

Note that "operating machine" refers to a machine such as a robot that operates based on a certain control module, and includes an industrial robot such as a multi-axis robot arm, for example. Specifically, "operating machines" encompass not only machines that operate in the real world but also machines serving as virtual models that cause machines in the real world to operate in a virtual world.

In the above-described configuration, the learning unit may be configured to generate a control module for each of a plurality of operating machines that are generated based on the type specified by the first parameter.

The learning data generation unit may generate learning data for each of a plurality of selectable operating machines, and the learning unit may be configured to generate a control module for each of the plurality of selectable operating machines, by performing learning using the corresponding learning data.

According to this configuration, it is possible to generate a control module that is suitable for each of the operating machines.

In the above-described configuration, the information processing device may further include: a learning data generation unit configured to generate learning data based on a success/failure determination result of the operation and control information of the operating machine used at this time, wherein the learning unit is configured to generate, using the learning data, the control module for the operating machine to realize a predetermined operation.

According to this configuration, it is possible to learn a control module through supervised learning.

In the above-described configuration, the learning data generation unit may generate the learning data for each of a plurality of operating machines that are generated based on the type specified by the first parameter, and the learning unit may be configured to generate a control module for each of a plurality of selectable operating machines, by performing learning using the corresponding learning data.

According to this configuration, it is possible to generate, through supervised learning, a control module that is suitable for each of the operating machines.

In the above-described configuration, the information processing device may further include: a first calculation unit configured to calculate an operation success rate for each of a plurality of combinations of operating machine and control module, based on a success/failure determination of the operation when the virtual model of the operating machine to which the corresponding control module is applied is operated in a virtual space that includes the at least one virtual model that is stochastically generated using at least the second parameter; and a first selection unit configured to select a combination of operating machine and control module based on the operation success rates.

According to this configuration, a simulation is performed in a virtual environment in which a virtual model that includes a constituent component having a characteristic with variation based on a second parameter, which defines a probability distribution with random variables set for the characteristic of the constituent component of the virtual model, is arranged, and a combination of operating machine and control module is selected based on the result of the simulation. Accordingly, it is possible to select a combination of operating machine and control module that is robust against variation that may occur in the real environment.

In the above-described configuration, the learning data generation unit may generate the learning data that includes a success/failure determination result of the operation, control information of the operating machine used at this time, and the first parameter used at this time, and the learning unit may be configured to generate a single control module that is applicable to a plurality of types of operating machines designated by different first parameters, by performing learning using learning data obtained based on the plurality of types of operating machines.

According to this configuration, it is possible to generate a general-purpose control module that is applicable to a plurality of types of operating machines. Accordingly, it is conceivable that the control module is applicable to any operating machine even if it was not used at the time of learning.

In the above-described configuration, preferably, the information processing device may further include: a second calculation unit configured to calculate an operation success rate when the control module is applied to the plurality of types of operating machines, based on a success/failure determination result of the operation when the virtual model of the operating machine to which the control module is applied is operated in a virtual space that includes the at least one virtual model that is stochastically generated using at least the second parameter; and a second selection unit configured to select an operating machine based on the operation success rates.

According to this configuration, a simulation is performed in a virtual environment in which a virtual model that includes a constituent component having a characteristic with variation based on a second parameter, which defines a probability distribution with random variables set for the characteristic of the constituent component of the virtual model, is arranged, and a combination of operating machine and control module is selected based on the result of the simulation. Furthermore, it is conceivable that the operating machine and the control module are applicable even if they were not used at the time of learning.

In the above-described configuration, the first parameter may include information relating to at least one of a kinematic structure of the operating machine and a shape of the operating machine.

Furthermore, in the above-described configuration, the second parameter may relate to a probability distribution with random variables set for at least one characteristic selected from size, installation position, color, and texture of a constituent component of the operating machine.

According to this configuration, it is possible to generate a robust control module that takes into consideration variation of a characteristic in the real environment of, specifically, an operating machine to which the control module is to be applied.

In the above-described configuration, the at least one virtual model may include at least one of a member that affects the surrounding environment of the operating machine, a member that is used together with the operating machine, a sensor for detecting an operation of the operating machine, and a work object of the operating machine, and the first parameter may include information relating to at least one of a type of the member that affects the surrounding environment of the operating machine, a type of the member that is used together with the operating machine, a type of the sensor for detecting an operation of the operating machine, and a type of the work object of the operating machine.

Furthermore, in the above-described configuration, preferably, the second parameter may relate to a probability distribution with random variables set for at least one characteristic selected from characteristics of the member that affects the surrounding environment of the operating machine, the member that is used together with the operating machine, the sensor for detecting an operation of the operating machine, and the work object of the operating machine.

According to this configuration, it is possible to generate a robust control module of an operating machine that takes into consideration variation of a characteristic in the real environment of, specifically, operation environment of the operating machine, a control object, and a sensor.

In the above-described configuration, the probability distribution of the second parameter may include a combination of a type of a distribution function of continuous values and a value determining a shape of that function, a combination of a distribution function of discrete values and a value determining a shape of that function, and a list of distribution of values.

According to this configuration, it is possible to generate a virtual environment that reflects various probability distributions that may occur in the real environment, and perform, for example, learning of a control module.

According to an aspect of the present invention, an information processing method is executed by an information processing device, the method including the steps of: receiving an input of a first parameter for specifying a type of at least one virtual model including a virtual model of an operating machine; receiving an input of a second parameter relating to a probability distribution with random variables set for a characteristic of a constituent component of the at least one virtual model; stochastically generating the at least one virtual model based on the first parameter and the second parameter; determining, when the virtual model of the operating machine is operated in a virtual space that includes the at least one virtual model that is stochastically generated, whether the operation is successful or failed; and generating by learning, based on an operation success/failure determination result, a control module for the operating machine to realize a predetermined operation.

According to this configuration, upon input of a second parameter that defines a probability distribution with random variables set for a characteristic of a constituent component of a virtual model, a control module is generated by learning, using the virtual model that includes the constituent component having the characteristic with variation based on the second parameter. Accordingly, it is possible to generate a control module robust against variation that may occur in a real environment.

Furthermore, since the control module is generated in the virtual environment, it takes only calculation time to obtain the control module. Accordingly, it is possible to obtain the control module of the operating machine within a shorter time period than in a case where learning data is generated in a real environment.

According to an aspect of the present invention, a program causes information processing device to execute the steps of: receiving an input of a first parameter for specifying a type of at least one virtual model including a virtual model of an operating machine; receiving an input of a second parameter relating to a probability distribution with random variables set for a characteristic of a constituent component of the at least one virtual model; stochastically generating the at least one virtual model based on the first parameter and the second parameter; determining, when the virtual model of the operating machine is operated in a virtual space that includes the at least one virtual model that is stochastically generated, whether the operation is successful or failed; and generating by learning, based on an operation success/failure determination result, a control module for the operating machine to realize a predetermined operation.

According to this configuration, upon input of a second parameter that defines a probability distribution with random variables set for a characteristic of a constituent component of a virtual model, a control module is generated by learning using the virtual model that includes the constituent component having the characteristic with variation based on the second parameter. Accordingly, it is possible to generate a control module robust against variation that may occur in a real environment.

Furthermore, since the control module is generated in the virtual environment, it takes only calculation time to obtain the control module. Accordingly, it is possible to obtain the control module of the operating machine within a shorter time period than in a case where learning data is generated in a real environment.

Note that, in the present specification, "unit", "means", "device", and "system" do not simply mean physical configurations, and may refer to a case in which the functionalities of the "unit", "means", "device", and "system" are realized by software. Furthermore, one functionality of "unit", "means", "device", and "system" may be executed by two or more physical configurations or device, or two or more functionalities of "unit", "means", "device", and "system" may be executed by a single physical configurations or device. Moreover, in the present invention, the phrases "different types of operating machines" and "different first parameters" mean that they are different from each other in at least one of an operating machine type, an operation type, and an operation environment of a combination.

DESCRIPTION OF EMBODIMENTS

Figure 1:
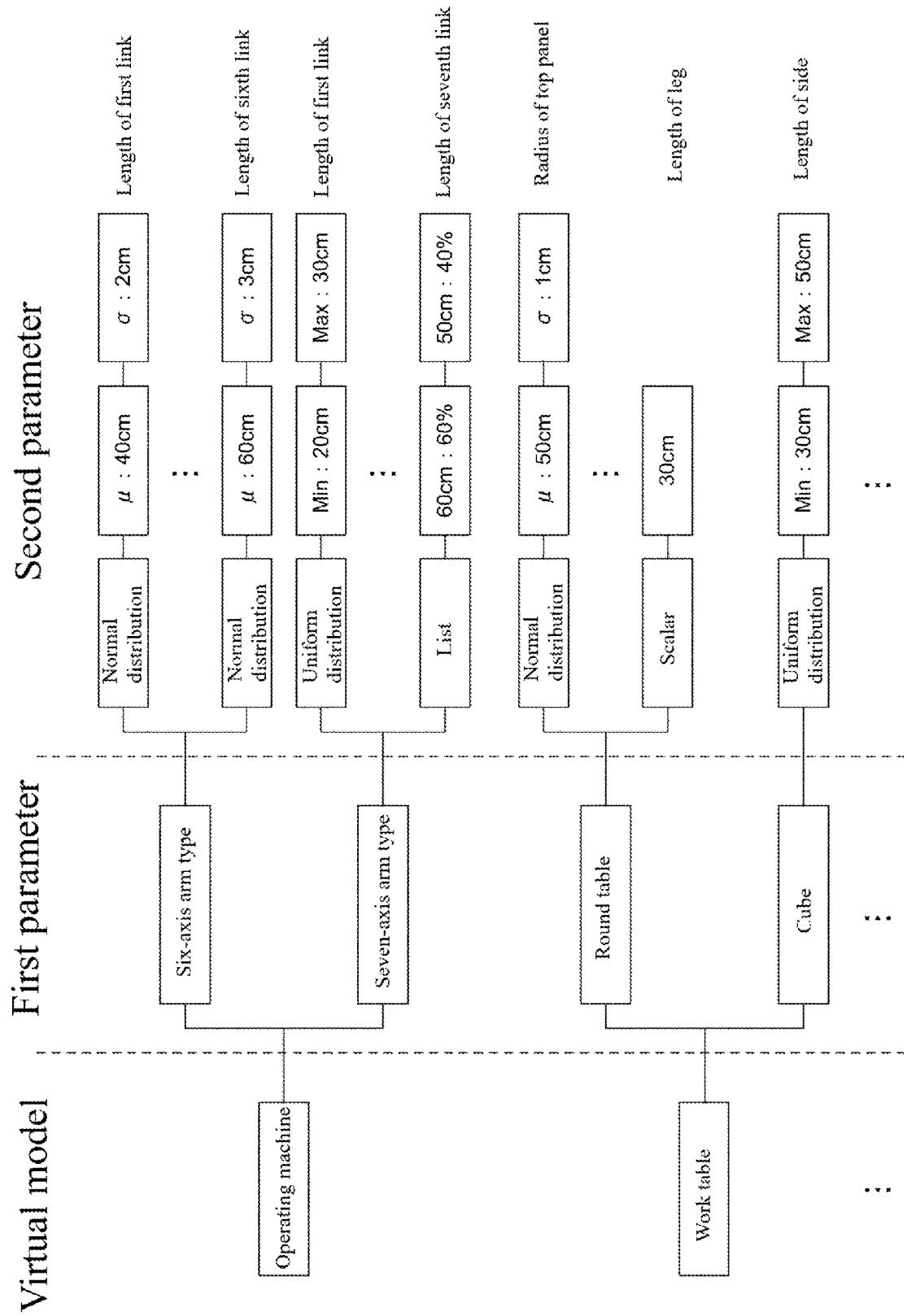
FIG. 1 is a diagram illustrating examples of parameters according to an embodiment.

Hereinafter, an embodiment of the present invention will be described with reference to the drawings. Note, however, that the following embodiment is merely an example, and does not intend to exclude various modifications and technical applications that are not explicitly described below. In other words, the present invention can be implemented in various modifications without departing from the spirit of the present invention. Furthermore, in the following description of the drawings, the same or similar portions are provided with and are indicated by the same or similar reference numerals. The drawings are schematic, and do not necessarily match the actual size, ratio, and the like. The drawings may also include different scales and ratios with respect to each other.

1 APPLICATION EXAMPLES

First, a brief overview of the embodiment will be described with reference to FIG. 1. An information processing device according to the present embodiment is a device for obtaining (training, producing), through learning, a control module of an operating machine such as an industrial robot for example. Here, "control module" refers to, for example, one unit or a combination of software that expresses a function for generating, upon receiving an input, an output relating to control of the operating machine, hardware in which the software is installed, or a device for realizing the functionalities of the software. The control module has a learning ability to learn about a task that is executed by the operating machine. In this context, "learning ability" refers to an ability to improve an ability to process a task based on experience acquired based on learning data.

In this case, it is also conceivable that the operating machine is actually operated in a real environment and performs learning using control content used in the operation and an operation result as learning data, but it requires a certain amount of time for the operating machine to operate in the real environment, and thus an enormous amount of time will be required to acquire a sufficient number of pieces of learning data. Accordingly, in the information processing device according to the present embodiment, an operating machine, a work object, a sensor for detecting an operation of the operating machine, and the like are arranged in a virtual space, the operating machine is virtually operated in the virtual space, and the obtained result is used as learning data. Accordingly, without actually operating the operating machine, learning data can be acquired only by simulating an operation in the virtual space through arithmetic processing, and thus it is possible to acquire a large amount of learning data within a shorter time period, and generate a control module using the acquired learning data.

Here, in a real environment, variation occurs in the size of members constituting an operating machine, the strength of a light source used together with the operating machine, the position at which a sensor (or sensors) for detecting an operation is (are) placed, and the like. Even if, without taking such variation into consideration, an operation result that is obtained in a virtual space in which the sizes of the members, the strength of the light source, the position at which the sensor is placed and the like are fixed is used as learning data to learn a control module, and the learned control module is applied to the real environment, an operation that is robust against variation in a real environment cannot be secured.

Accordingly, the information processing device according to the present embodiment stochastically sets various characteristics such as the sizes and positions of the operating machine, the sensor, the work object, the light source, and the like that are arranged in the virtual space (hereinafter, these components arranged in the virtual space are referred to collectively as "virtual models"). By using, as learning data, an operation result obtained by operating the operating machine in the virtual environment in which the virtual models with stochastic variation are arranged in this way to generate a control module, it is possible to realize an operation that is robust against variation in the real environment.

In the following description, a parameter for defining the type of a virtual model that is arranged in a virtual environment is referred to as a "first parameter", and a parameter for defining a probability distribution with random variables set for a characteristic of a constituent component of the virtual model is referred to as a "second parameter".

For example, in an example of FIG. 1, the first parameter can specify, as a virtual model of an operating machine arranged in a virtual environment, two types, namely, a "six-axis arm type" and a "seven-axis arm type". The first parameter can further specify, as a virtual model of a work table, two types, namely, a "round table" and a "cube".

Furthermore, a characteristic of a constituent component (or characteristics of a plurality of constituent components)) of the virtual model specified by the first parameter is designated by the second parameter. For example, in the case of the operating machine of the "six-axis arm type", the second parameter designates that a characteristic "length" of a constituent component "first link" is continuously given by probability distribution of a normal distribution function, and that μ (average) and σ (standard deviation), which are variables of the normal distribution function, are respectively set to 40 cm and 2 cm. Also, similarly, in the case of "seven-axis arm type" for example, the second parameter designates that a characteristic "length" of a constituent component "first link" is given as a uniform distribution function, and that the minimum value (Min) and maximum value (Max) are respectively set to 20 cm and 30 cm. Furthermore, the second parameter designates that a characteristic "length" of a constituent component "seventh link" is given as a discrete value in a list, and that the probability that the length is 60 cm is 60%, and the probability that the length is 50 cm is 40%.

In the information processing device according to the present embodiment, in this way, the type of a virtual model that is arranged in a virtual environment is given by the first parameter in advance, and the event probabilities of possible values of a characteristic of a constituent component of the virtual model are given by the second parameter in advance. Accordingly, the information processing device generates at least one virtual model specified by the first parameter that includes a constituent component having a characteristic with variation specified by the second parameter, arranges the at least one generated virtual model in a virtual environment, and performs a simulation in which the virtual model of the operating machine is operated in the virtual environment. As described above, since the operating machine is also a type of virtual model, for example, a characteristic of a constituent component of the operating machine (such as, for example, in a case of an operating machine that performs a holding operation, a physical characteristic of the operating machine for operating the holding operation) may also be subject to stochastic variation specified by the second parameter. The information processing device repeatedly performs a simulation of an operation of the operating machine in the virtual environment in which such a virtual model with stochastic variation is arranged, and generates, by learning, a control module using operation results as learning data. Specifically, by setting the second parameter based on variation in a real environment, it is possible to obtain, through learning, a control module that is robust against the variation in the real environment.

2 CONFIGURATION EXAMPLE 1

The following will describe a configuration example 1 of an information processing device 100 according to the present embodiment with reference to FIGS. 2 to 5. Note that, in the configuration example 1, if there are a plurality of selectable operating machines, a control module 133 suitable for each of the operating machines will be learned.

2.1 Operation Configuration

Figure 2:
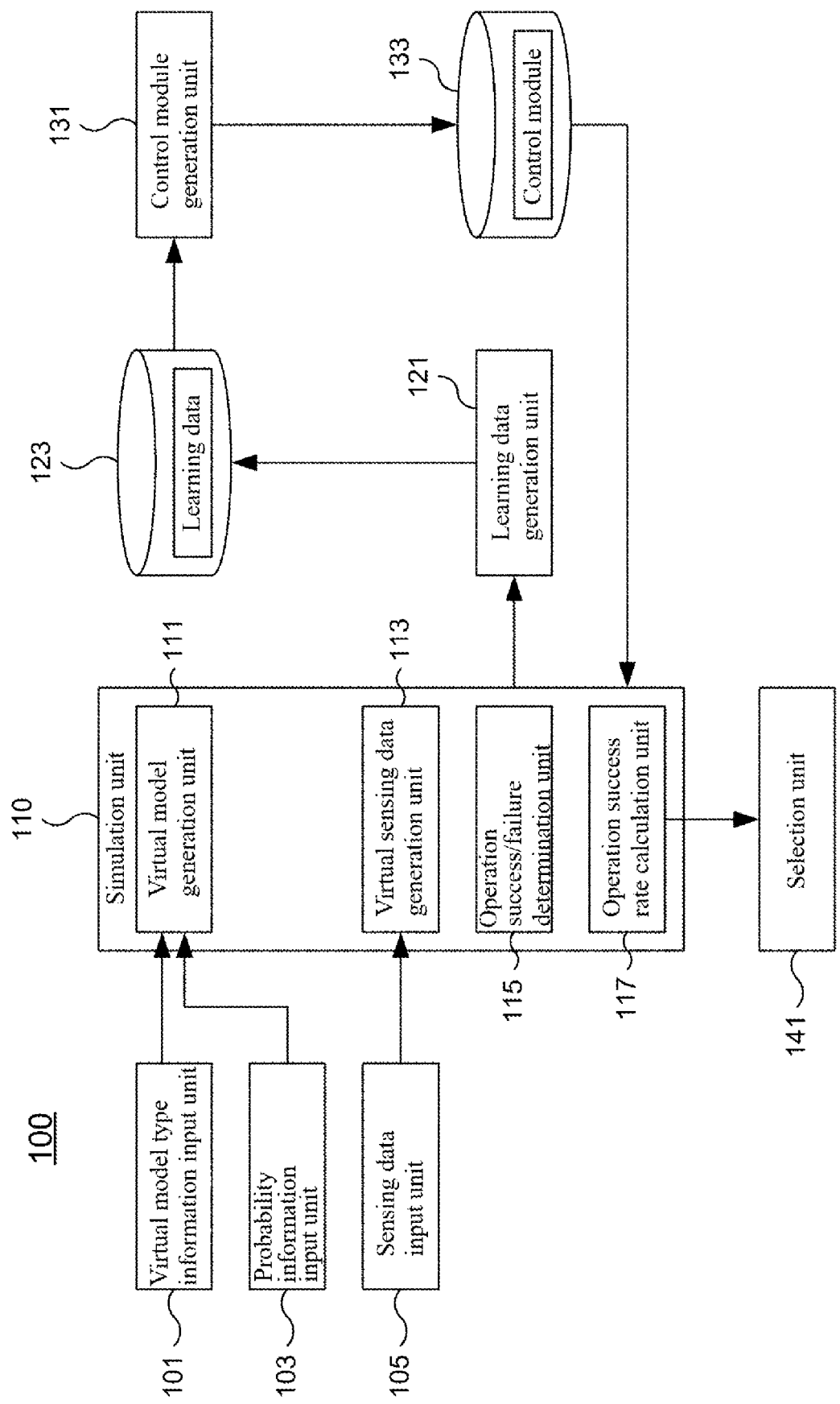
FIG. 2 is a diagram schematically illustrating an example of an information processing device according to the embodiment.

First, an example of an operation configuration of the information processing device 100 according to the configuration example 1 will be described with reference to FIG. 2.

The information processing device 100 mainly includes a virtual model type information input unit 101, a probability information input unit 103, a sensing data input unit 105, a simulation unit 110, a learning data generation unit 121, a control module generation unit 131, and a selection unit 141. Note that these configurations may be realized as a program that runs on a processor, or may be realized as dedicated hardware such as one or more semiconductors. An example of the hardware configuration when these configurations are realized as a program will be described later with reference to FIG. 5.

The virtual model type information input unit 101 receives an input of information for specifying a type of at least one virtual model including an operating machine to be arranged in a virtual environment, that is, the above-described first parameter. Note that the virtual model type information input unit 101 is an example of a "first input unit" of the present invention.

The first parameter can specify at least one of the type of the kinematic structure of the operating machine, the type of the hand unit shape, the type of a member (such as, for example, a light source, a floor, or a wall surface) that may affect the surrounding environment of the operating machine, the type of a member (such as, for example, a work table and a tray) used together with the operating machine, the type of a sensor (that may include a camera for example) or the like for detecting an operation of the operating machine, the type of a work object to be worked or operated on by the operating machine, and the like.

The probability information input unit 103 receives an input of information relating to a probability distribution with random variables set for a characteristic (such as, for example, the size, weight, installation position, color, or texture) of a constituent component of a virtual model to be arranged in the virtual environment (such as, for example, a link that constitutes a six-axis arm serving as a virtual model, as described with reference to FIG. 1), that is, the above-described second parameter. Note that the probability information input unit 103 is an example of a "second input unit" of the present invention.

Note that the second parameter includes information relating to a probability distribution with random variables set for at least one of the characteristics, such as the kinematic structure of the operating machine and the hand unit shape, and characteristics of a member (such as, for example, a light source, a floor, or a wall surface) that may affect the surrounding environment of the operating machine, a member (such as, for example, a work table or a tray) used together with the operating machine, a sensor (that can include a camera for example) or the like for detecting an operation of the operating machine, a work object to be worked or operated on by the operating machine, and the like. More specifically, the second parameter indicates, for example, information relating to a probability distribution with a random variable set for one of such characteristics as the size of members of the operating machine, the installation position of the operating machine, the color of the operating machine, the texture of the operating machine, the sizes, the installation positions, color, and texture of the work table/floor/wall surface, the installation position of the sensor, the focus of the camera, the view angle of the camera, the sizes, installation positions, the movement speed, the acceleration, and the color of members of the work object, and the like.

Here, the second parameter can express a probability distribution with random variables set for a characteristic, using a combination of a type of distribution function of continuous values (such as normal distribution or uniform distribution, for example) and a value defining a shape of that function (such as μ and σ in the case of normal distribution, for example), a combination of a distribution function of discrete values and a value defining a shape of that function, a list of distribution of values (such as a list indicating that a first value is taken with a probability of X %, a second value is taken with a probability of Y %, a third value is taken with a probability of Z %, . . . ), or the like.

The sensing data input unit 105 receives an input of a result of detection (sensor detection result) that is performed by a sensor (that may include a camera for example) in a real environment in which an operating machine, a light source, the sensor, and the like are actually arranged. A later-described virtual sensing data generation unit 113 can combine a sensor detection result in a virtual environment with the sensor detection result in the real environment to generate pseudo-sensing data, which is more approximate to the real environment, and then it is possible to generate learning data 123 based on the pseudo-sensing data. However, if the learning data 123 is generated by, instead of performing the above-described processing, using only the sensor detection result in the virtual environment, the sensing data input unit 105 may also be omitted.

The simulation unit 110 generates at least one virtual model including the operating machine, and performs a simulation in which the operating machine is virtually operated in a virtual environment in which the generated virtual model is arranged. Here, if there are a plurality of selectable operating machines (operating machines that can be designated by the first parameter), simulation will be performed for each of the operating machines. The simulation unit 110 includes a virtual model generation unit 111, the virtual sensing data generation unit 113, an operation success/failure determination unit 115, and an operation success rate calculation unit 117.

The virtual model generation unit 111 generates a large number of one or more virtual models that are arranged in the virtual environment. Note that the virtual model generation unit 111 is an example of a "virtual model generation unit" of the present invention. The type of the virtual model generated by the virtual model generation unit 111 is specified by the first parameter input from the virtual model type information input unit 101. Furthermore, a characteristic of a constituent component of the virtual model is stochastically determined based on the second parameter input from the probability information input unit 103. In other words, if the virtual model generation unit 111 generates 100 virtual models for one type, variations occur in characteristics of constituent components of the generated virtual models based on the second parameter. Specifically, by setting a probability distribution of the second parameter based on a probability distribution in the real world, the information processing device 100 can generate, in the virtual environment, learning data 123 that is approximate to learning data collected in a real environment with variation.

The virtual sensing data generation unit 113 generates virtual sensing data, which is a result of detection of an operation of the operating machine (which is a virtual model), the surrounding environment thereof, or the like when the operating machine is operated in the virtual environment. Here, if an input of information relating to the sensor detection result in the real environment has been received from the sensing data input unit 105, the virtual sensing data generation unit 113 may also combine the virtual sensing data with the sensor detection result in the real environment to generate pseudo-sensing data, which is more approximate to the real environment.

The operation success/failure determination unit 115 causes, using a result detected by the sensor (of the virtual model) in the virtual environment, the operating machine, to which the control module 133 is to be applied, to operate with a suitable control content, and determines whether or not a preset operation result is obtained. If the preset operation result has been obtained, it is determined that the operation is successful, whereas if no such a result has been obtained, it is determined that the operation is failed. Note that "result detected by the sensor in a virtual environment" corresponds to the above-noted virtual sensing data, but pseudo-sensing data may also be used, instead of the virtual sensing data (note that, hereinafter, the term "virtual sensing data" may also be read as "pseudo-sensing data" unless otherwise noted). Note that the operation success/failure determination unit 115 is an example of a "determination unit" of the present invention.

Here, as described above, the virtual model generation unit 111 generates a large number of virtual models for one type, in order to obtain a sufficient number of effective parameters. The operation success/failure determination unit 115 uses the virtual models generated by the virtual model generation unit 111 to cause the operating machine to operate in the virtual environment, and obtains operation results for the respective virtual models. The operation success/failure determination results obtained by the operation success/failure determination unit 115 are output to the learning data generation unit 121, together with the operation content (control information) of the operating machine and the virtual sensing data (that may also be pseudo-sensing data).

The operation success rate calculation unit 117 calculates, by collecting operation results obtained when trials are made using the same operating machine, the operation success rate of obtaining a predetermined operation result when the operating machine is operated in the virtual environment. Note that the operation success rate calculation unit 117 is an example of a "first calculation unit" of the present invention.

Here, to calculate the operation success rates, the simulation unit 110 needs to repeatedly perform a simulation in the virtual environment, and at this time, the virtual models stochastically generated based on the second parameter by the virtual model generation unit 111 are used as virtual models that are arranged in the virtual environment. In other words, the operation success rates are calculated for the virtual models subject to variation, similar to a real environment subject to variation, and thus, by specifically setting a probability distribution using the second parameter based on a probability distribution in the real world, it is possible to calculate an operation success rate that is approximate to the real environment.

The learning data generation unit 121 generates learning data 123 based on a result of the simulation performed by the simulation unit 110. The learning data 123 can include operation content (control content) of the operating machine, virtual sensing data, and information relating to an operation success/failure determination result obtained when the operation content and the virtual sensing data are used. Here, if there are a plurality of selectable operating machines, learning data 123 will be generated for each of the operating machines. The learning data generation unit 121 is an example of a "learning data generation unit" of the present invention.

The control module generation unit 131 generates a control module 133 through learning using the learning data 123. Here, if there are a plurality of selectable operating machines, the control module generation unit 131 will generate a control module 133 for each of the operating machines. Note that the control module generation unit 131 is an example of a "learning unit" of the present invention.

The control module 133 that is generated by the control module generation unit 131 may have any form, and may employ a neural network. In this case, for example, virtual sensing data and a unit operation of the operating machine may be set as input by the neural network, and the operation success rate for the combination of the virtual sensing data and the unit operation may be set as an output. The control module generation unit 131 generates, through learning, a neural network (that is, the control module 133) in which the weights of nodes are adjusted so that the output result of the neural network is approximate to the operation success rate obtained as a result of simulation in the virtual space. By combining a plurality of unit operations serving as unit operation candidates with one piece of virtual sensing data, the operation success rate is learned with respect to the combination of the unit operations. The obtained neural network is output as the control module 133 from the control module generation unit 131 to a suitable storage medium.

Note that, when the control module 133 is used to operate the operating machine (it is not essential whether it is the operating machine in the virtual environment or the operating machine in the real environment), it is sufficient to perform, for example, the following processing. By inputting sensing data detected by the sensor and any unit operation that can be executed by the operating machine to the neural network (control module 133), it is possible to obtain the success rate when this unit operation is selected. Accordingly, a plurality of unit operations that may be operation candidates may be combined with one set of sensing data, the operation success rates for the respective combinations may be calculated, and then the unit operation that has the highest operation success rate may be regarded as the most recent unit operation.

The control module 133 generated by the control module generation unit 131 is output to the simulation unit 110. The operation success rate calculation unit 117 of the simulation unit 110 applies the control module 133 to calculate the operation success rate when the operating machine is operated. Here, if there are a plurality of selectable operating machines, the operation success rate calculation unit 117 will calculate an operation success rate for each of the combinations of operating machine and control module 133.

If there are a plurality of selectable operating machines, the selection unit 141 will select a combination of the operating machine used as a real machine and the control module 133. Note that the selection unit 141 is an example of a "first selection unit" of the present invention. More specifically, the selection unit 141 only needs to select, from among the combinations of operating machine and control module 133, the combination of operating machine and control module 133 that has the highest operation success rate calculated by the operation success rate calculation unit 117, as the operating machine used as the real machine and the control module 133, for example.

2.2 Process Flow

Figure 3:
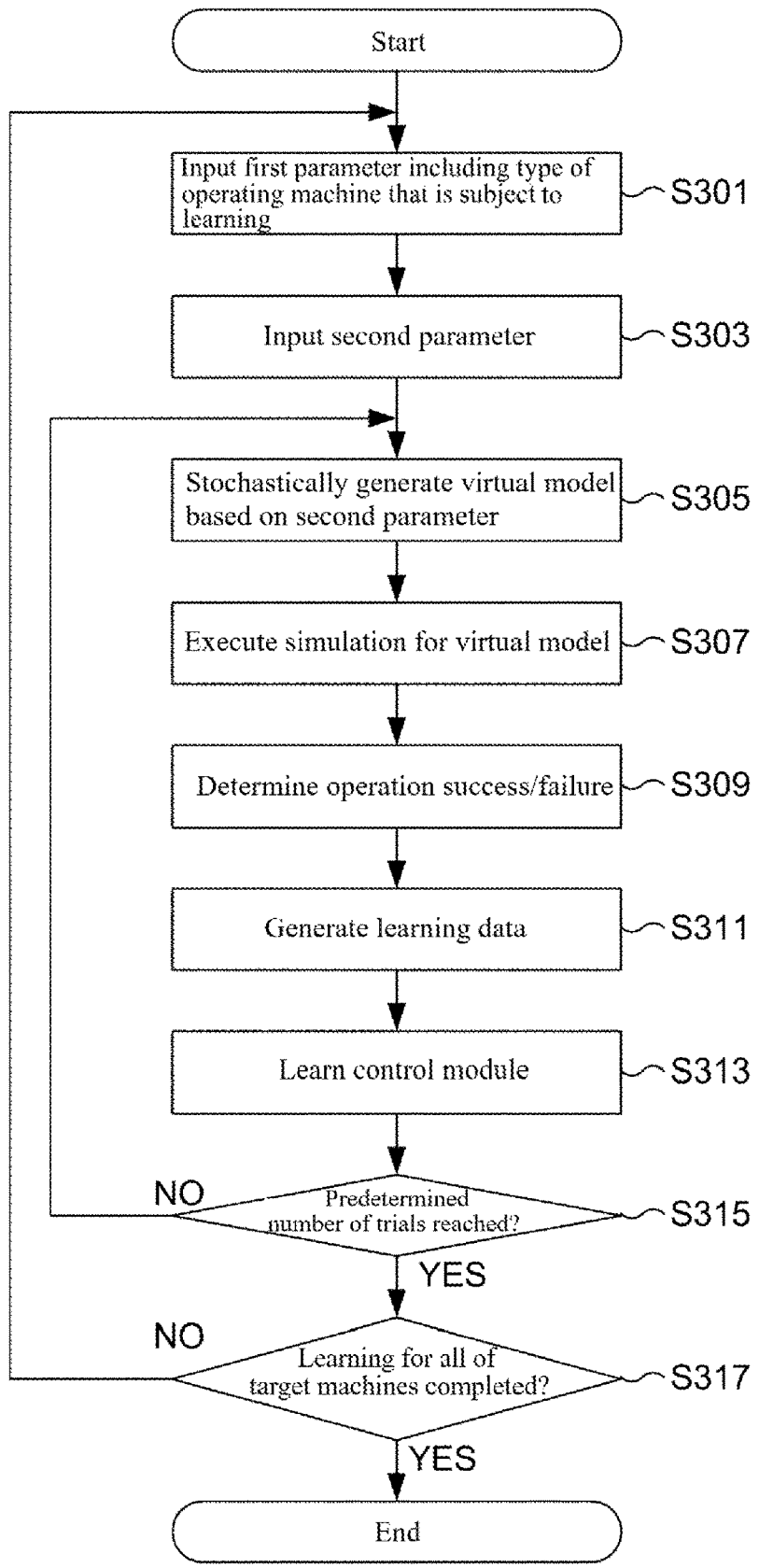
FIG. 3 is a flowchart illustrating an example of a processing procedure of the information processing device according to the embodiment.
Figure 4:
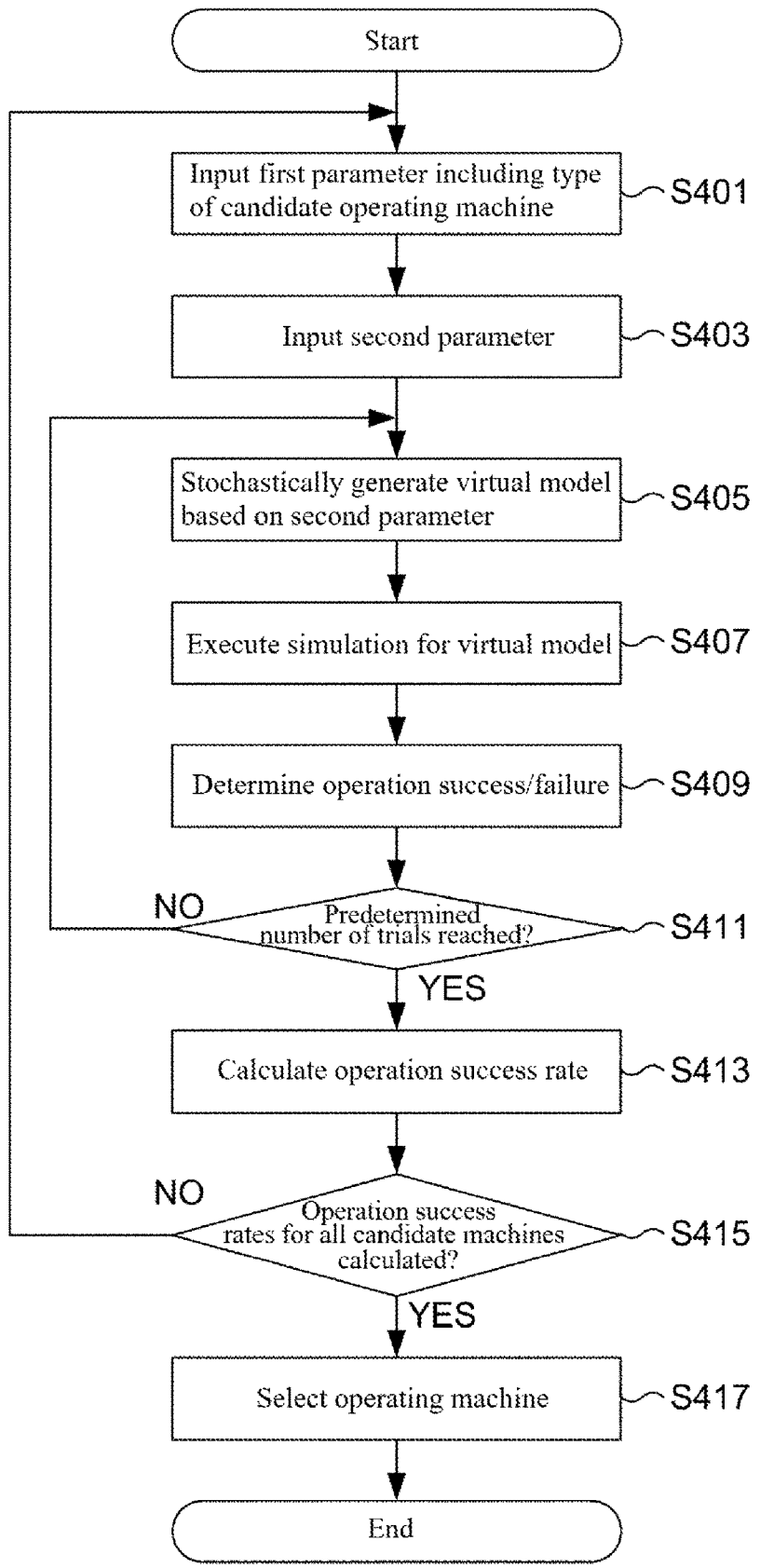
FIG. 4 is a flowchart illustrating an example of a processing procedure of the information processing device according to the embodiment.

The following will describe a flow of processing performed by the information processing device 100 according to the configuration example 1 with reference to FIGS. 3 and 4. FIGS. 3 and 4 are flowcharts showing flows of processing performed by the information processing device 100.

Note that later-described processing steps may be executed in any order or may be executed in parallel to each other as long as processing contents are not inconsistent, or another step may also be added between processing steps. Furthermore, a step described as one step for convenience may also be divided into a plurality of steps and be executed, or steps described as a plurality of steps for convenience may also be executed as one step. The same applies to flowcharts of FIGS. 6 to 9, which will be described later.

2.2.1 Learning of Control Module 133

First, the flow of processing for learning the control module 133 will be described with reference to FIG. 3.

The virtual model type information input unit 101 receives an input of a first parameter relating to at least one virtual model to be arranged in a virtual environment, the first parameter including identification of the type of an operating machine that is subject to learning of the control module 133 (step S301). Also, the probability information input unit 103 receives an input of a second parameter relating to a probability distribution with random variables set for a characteristic of a constituent component of the virtual model (step S303). The virtual model generation unit 111 generates the at least one virtual model of the type designated by the first parameter, based on the constituent component having the characteristic stochastically set by the second parameter (step S305). The simulation unit 110 performs a simulation in which the operating machine (target operating machine) that is subject to learning is operated in a virtual environment in which the at least one generated virtual model is arranged (step S307). At this time, the virtual sensing data generation unit 113 generates, at a suitable point in time during the operation, virtual sensing data, which is a result of detection of the situation of the virtual environment. The operation success/failure determination unit 115 determines whether or not, as a result of such simulation being performed in this way, the operating machine has achieved a preset object, that is, whether or not the operation has been successful (step S309).

The learning data generation unit 121 generates learning data 123 using the determination result (step S311). As described above, the learning data 123 can include the operation content (control information) of the operating machine, the virtual sensing data, and information relating to an operation success/failure determination result when the operation content (control information) and the virtual sensing data are used.

Upon generation of the learning data 123, the control module generation unit 131 uses the learning data 123 to generate the control module 133 of the target operating machine (step S313). The specific example of the method for learning the control module 133 has been described above, and thus the description will be omitted herein.

The simulation unit 110, the learning data generation unit 121, and the control module generation unit 131 repeat such processing from generation of a virtual model in the virtual environment to determination of an operation a predetermined number of trials until the sufficient number of parameters can be obtained (No in step S315). Furthermore, if there are a plurality of types of selectable operating machines (target operating machines), the information processing device 100 repeat the processing from steps S301 to S315 the same number of times as the number of operating machines (No in step S317).

2.2.2 Selection of Operating Machine

The following will describe a flow of process for selecting, from among a plurality of selectable operating machines, an operating machine suitable for being applied to a real environment with reference to FIG. 4.

The virtual model type information input unit 101 receives an input of a first parameter relating to one candidate from a plurality of operating machines that is selectable when a task is actually executed in a real environment, for example (step S401). Furthermore, the probability information input unit 103 receives an input of a second parameter relating to a probability distribution with random variables set for a characteristic of a constituent component of the virtual model (step S403). The virtual model generation unit 111 generates at least one virtual model of the type designated by the first parameter, based on the constituent component having the characteristic stochastically set by the second parameter (step S405). The simulation unit 110 performs a simulation in which the operating machine that is the selected candidate is operated in a virtual environment in which the at least one generated virtual model is arranged (step S407). At this time, the operating machine is operated based on the control module 133 generated by the control module generation unit 131. Furthermore, the virtual sensing data generation unit 113 generates, at a suitable point in time during the operation, virtual sensing data, which is a result of detection of the situation in the virtual environment. The operation success/failure determination unit 115 determines whether or not, as a result of this simulation being performed in this way, the operating machine has achieved the preset object, that is, whether or not the operation has been successful (step S409).

The simulation unit 110 repeats this processing from generation of a virtual model in the virtual environment to determination of an operation a predetermined number of trials until the sufficient number of parameters can be obtained (No in step S411). The operation success rate calculation unit 117 calculates the operation success rates for the combinations of operating machine and control module 133 (step S413).

The information processing device 100 performs the processing from steps S401 to S413 on all of the combinations of the selectable operating machine and the control module 133 (No in step S415). If the operation success rates for all of the combinations of the selectable operating machine and the control module 133 have been calculated (Yes in step S415), the selection unit 141 selects, based on the operation success rates, the combination of operating machine and control module 133 for actual use (step S417). At this time, the selection unit 141 only needs to select, for example, the combination of operating machine and control module 133 that has the highest operation success rate.

2.3 Hardware Configuration

Figure 5:
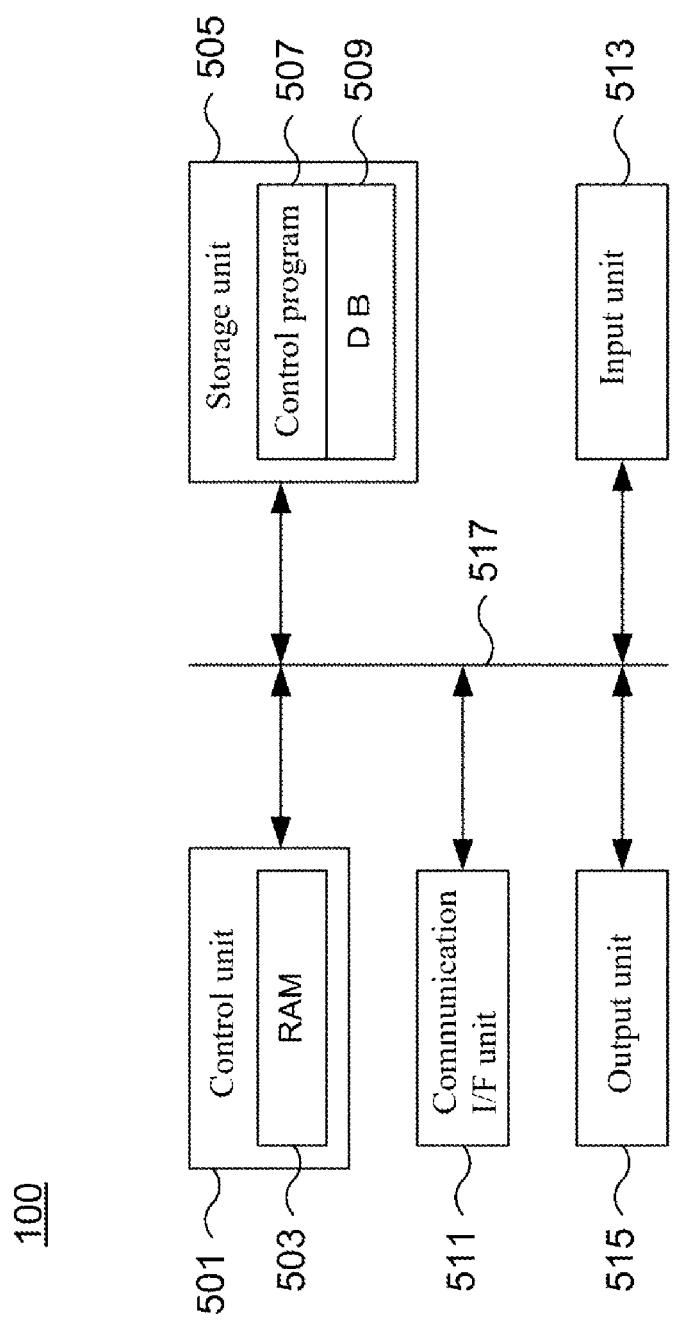
FIG. 5 is a diagram schematically illustrating an example of a hardware configuration of the information processing device according to the embodiment.
Figure 6:
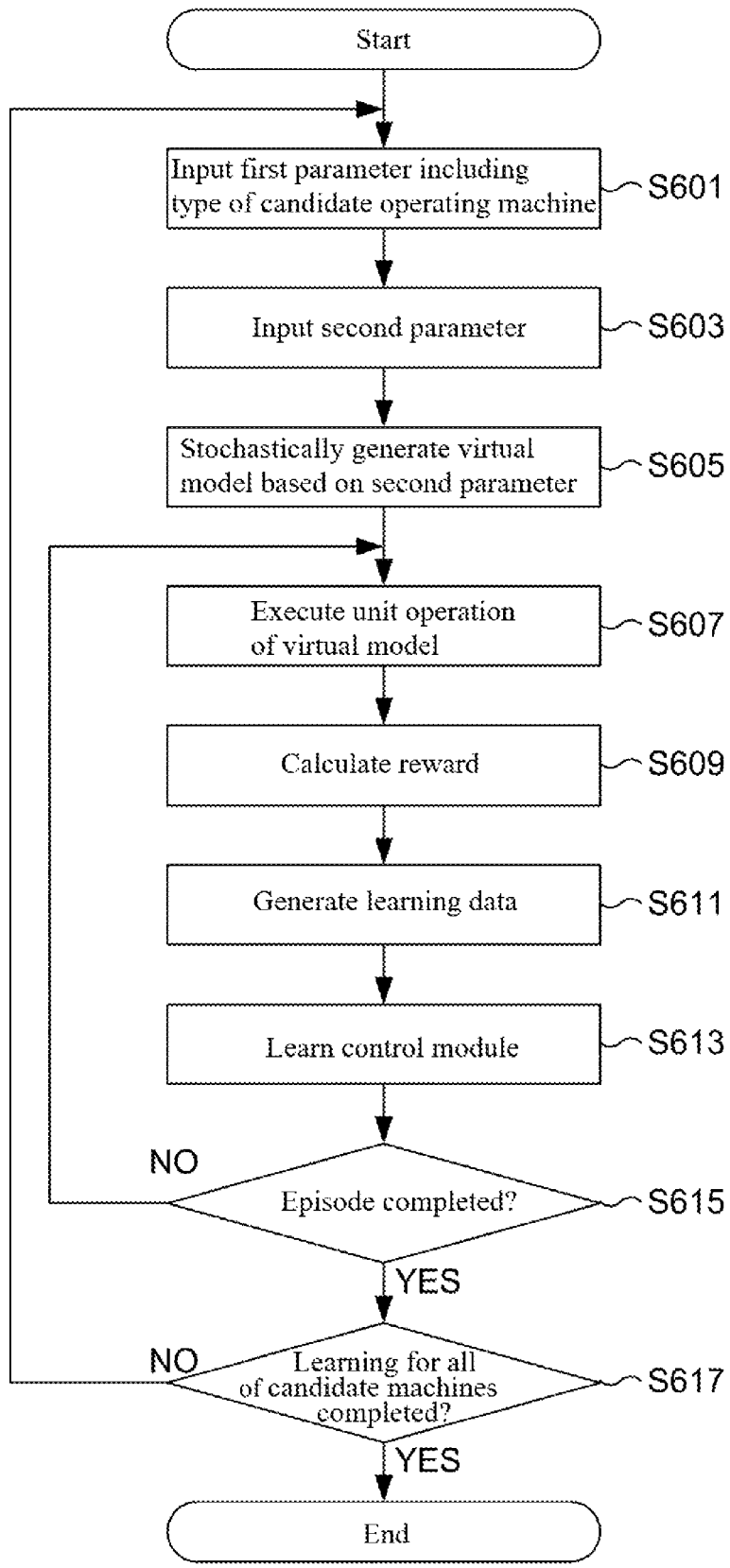
FIG. 6 is a flowchart illustrating an example of a processing procedure of the information processing device according to the embodiment.

The following will describe a hardware configuration by which the information processing device 100 can be realized with reference to FIG. 5. FIG. 5 schematically illustrates an example of a hardware configuration of the information processing device 100 according to the present embodiment.

The information processing device 100 shown in the example of FIG. 5 includes a control unit 501, a storage unit 505, a communication interface (I/F) unit 511, an input unit 513, and an output unit 515, and these units are connected such that they can communicate with each other via a bus line 517.

The control unit 501 includes a CPU (Central Processing Unit), a RAM (Random Access Memory) 503, a ROM (Read Only Memory), and the like, and performs control of the constituent components in accordance with information processing. More specifically, for example, by reading a control program 507 from the storage unit 505 to the RAM 503 and executing the control program 507, the CPU that may be included in the control unit 501 can execute various types of processing of the virtual model type information input unit 101, the probability information input unit 103, the sensing data input unit 105, the simulation unit 110, the learning data generation unit 121, the control module generation unit 131, and the selection unit 141 that are shown in FIG. 2.

The storage unit 505 is an auxiliary storage device such as a hard disk drive (HDD) or a solid state drive (SSD) for example, and stores the control program 507 that is executed by the control unit 501, and a database (DB) 509, for example. The DB 509 can manage the learning data 123 and the control module 133 that are shown in FIG. 2, and the like. Besides, virtual models generated by the virtual model generation unit 111, virtual sensing data generated by the virtual sensing data generation unit 113, and the like can also be stored in the storage unit 505.

The control program 507 is a program for executing the processing of the information processing device 100 that has been described with reference to FIGS. 2 to 4. Specifically, the configurations of the virtual model type information input unit 101, the probability information input unit 103, the sensing data input unit 105, the simulation unit 110, the learning data generation unit 121, the control module generation unit 131, and the selection unit 141 that are shown in FIG. 2 can be realized as the control program 507.

The communication interface unit 511 is a communication module for performing, for example, wired or wireless communication with another device. The communication I/F unit 511 uses any communication method to communicate with another device, but examples of the communication method include a LAN (Local Area Network) and a USB (Universal Serial Bus). For example, the control module 133 may be output to a not-shown operating machine and the like via the communication I/F unit 511.

The input unit 513 is a device for accepting various types of input operations from a user, and the like, and can be realized by, for example, a mouse and a keyboard, or a touch panel. The output unit 515 is a device for notifying, for example, a user who uses the information processing device 100 of various types of information using display or sound such as a display device or a speaker, for example. For example, it is conceivable that the output unit 515 notifies the user by, for example, displaying information relating to the operating machine selected by the selection unit 141.

2.4 Effects of Configuration Example 1

As described above, in the information processing device 100 according to the configuration example 1, upon receiving an input of a second parameter that defines a probability distribution with random variables set for characteristics of constituent components of a virtual model, a virtual model is generated that includes the constituent component having a characteristic with variation based on the second parameter, then a simulation is performed in which the operating machine is operated in a virtual environment in which the virtual model is arranged, and the operation result is evaluated. A control module 133 of the operating machine that is robust against variation that may occur in the real environment can be obtained by using the learning data 123 based on the operation result.

Furthermore, after the same processing is repeatedly performed on all of selectable operating machines to generate control modules 133, a simulation is further performed on the operating machines to which the control modules 133 are applied in the virtual environment in which the virtual models are arranged that have constituent components having characteristics with variation based on the second parameter, and the result thereof is evaluated. By selecting, among them, the combination of operating machine and control module 133 that has the highest operation success rate, it is possible to select a combination of operating machine and control module 133 that is robust against variation that may occur in the real environment.

2.5 Modification of Configuration Example 1

Note that, in the above-described configuration example 1, the present invention is applied to a technique for autonomously obtaining a control module of an automated machine using supervised learning, but the present invention is not limited to the supervised learning. For example, the present invention is also applicable to a technique for autonomously obtaining a control module of an automated machine using reinforcement learning. The following will describe a configuration and processing when the present invention is applied to reinforcement learning with reference to FIG. 6.

The processing from steps S601 to S605 is the same as that in the configuration example 1 described with reference to FIG. 4, and thus the description will be omitted. If the present invention is applied to reinforcement learning, the operation success/failure determination unit 115 will function as a reward calculation unit, and calculates reward, instead of obtaining the operation success/failure determination result, each time a virtual model of the automated machine is operated (step S609). The learning data generation unit 121 generates learning data 123 that includes the calculated reward (step S611), and stores the generated learning data 123 in a suitable storage medium. The control module generation unit 131 reads the learning data 123 from the storage medium at intervals of a predetermined number of behaviors, and generates (trains) the control module 133 (step S613). The control module generation unit 131 may generate, by learning, the control module 133 after each behavior or at intervals of a plurality of number of behaviors. Note that it is preferable that the "behavior" be defined as a unit operation of the operating machine (step S615). The information processing device 100 repeats the processing until learning for all of types of candidate operating machines is complete (step S617).

Here, if it is implemented that only the most recent learning data 123 is read by the control module generation unit 131, only the learning data 123 of the same virtual model will be used, and thus it will be difficult to learn a robust control module 133. Accordingly, if the learning data 123 is randomly read from the storage medium, learning data 123 of a different virtual model changed due to the second parameter can be used for learning, and thus it is possible to obtain a more robust control module 133.

Alternatively, by executing simulations by the simulation unit 110 in parallel or setting virtual models in simulations to be different from each other in a random manner due to the second parameter, then putting together learning data 123 acquired through the simulations, and performing learning of the control module generation unit 131, learning data 123 of a different virtual model changed due to the second parameter can be used for learning. Also, in this case, the control module generation unit 131 can obtain a robust control module 133.

3 CONFIGURATION EXAMPLE 2

Hereinafter, a configuration example 2 of the information processing device 100 according to the present embodiment will be described. Note that, in the configuration example 2, a general-purpose control module 133 that is applicable to a plurality of operating machines is obtained through learning.

3.1 Operation Configuration

The overall operation configuration of the information processing device 100 according to the configuration example 2 is the same as that of the configuration example 1. Furthermore, the information processing device 100 according to the configuration example 2 can be realized by the same hardware configuration as that of the information processing device 100 according to the configuration example 1, and thus the description regarding the hardware configuration will be omitted.

The following description will be given focusing differences from the configuration example 1 with reference to FIG. 2. In the following description, configurations that may be the same as those in the configuration example 1 will be omitted.

The virtual model type information input unit 101 receives an input of information for specifying the type of at least one virtual model including an operating machine to be arranged in a virtual environment, that is, the first parameter. Here, in the configuration example 2, the first parameter can designate a plurality of types of virtual models. The types of virtual models that can be designated by the first parameter are the same as in the configuration example 1. In other words, the first parameter in the configuration example 2 can designate a plurality of different types of operating machines, a plurality of different types of environment, a plurality of different types of work objects, or the like.

The probability information input unit 103 receives an input of information relating to probability distributions with random variables set for characteristics of constituent components of virtual models to be arranged in a virtual environment, that is, the second parameter. As described above, since the first parameter can designate a plurality of types of virtual models, the second parameter needs to include, for each of the plurality of types of virtual models, information relating to a probability distribution with random variables set for a characteristic of a constituent component.

The sensing data input unit 105 and the virtual sensing data generation unit 113 that uses the sensing data input unit 105 according to the configuration example 2 may be the same as those in the configuration example 1.

The simulation unit 110 performs a simulation in which, after at least one virtual model serving as an operating machine has been generated, the operating machine is virtually operated in a virtual environment in which the at least one generated virtual model is arranged. Here, if there are a plurality of types of operating machines that are designated by the first parameter, the simulation unit 110 will perform a simulation on each of the types of operating machines.

The virtual model generation unit 111 included in the simulation unit 110 generates a large number of one or more virtual models that is arranged in the virtual environment. At this time, the virtual models generated by the virtual model generation unit 111 may be of the plurality of types designated by the first parameter, and each virtual model is generated that includes a constituent component having a characteristic with variation based on the second parameter.

The operation success/failure determination unit 115 causes, using a result of detection performed by a sensor (sensor serving as a virtual model) in the virtual environment, the operating machine, to which the control module 133 is to be applied, to operate with a suitable control content, and determines whether or not a preset operation result is obtained. The operation success/failure determination result obtained by the operation success/failure determination unit 115 is output to the learning data generation unit 121, together with the operation content (control content) of the operating machine and the virtual sensing data (that may also be pseudo-sensing data).

Here, the virtual model generation unit 111 generates a large number of virtual models for one type, in order to obtain the sufficient number of trial parameters. Furthermore, since the virtual model generation unit 111 in the configuration example 2 also generates a plurality of types of virtual models, the operation success/failure determination unit 115 uses virtual models generated for each of the plurality of types to operate the operating machine in the virtual environment, and determines operation results for them.

The operation success rate calculation unit 117 collects operation results obtained when trials are made using the operating machine, and thereby calculates the operation success rate of obtaining a predetermined operation result when the operating machine is operated in the virtual environment. Here, "operation success rate" can be calculated for a single type of virtual environment, that is, a single combination of the first parameter. Note that the operation success rate calculation unit 117 according to the configuration example 2 is an example of "second calculation unit" of the present invention.

The learning data generation unit 121 generates learning data 123 based on a result of the simulation performed by the simulation unit 110. The learning data 123 can include the first parameter used for the generation of the virtual models, operation content (control content) of the operating machine, virtual sensing data, and information relating to an operation success/failure determination result obtained when the operation content and the virtual sensing data are used. Here, the learning data generation unit 121 generates learning data 123 for a plurality of types of operating machines that have the same functionality.

The control module generation unit 131 generates a control module 133 through learning using the learning data 123. Here, as described above, the control module 133 of the configuration example 2 that is generated by the control module generation unit 131 is not generated for each of the plurality of types of operating machines but is a single general-purpose control module that performs control suitable for each type of the operating machine by designating the first parameter that corresponds to the type of the operating machine to be controlled.

The single general-purpose control module 133 generated by the control module generation unit 131 is output to the simulation unit 110. The operation success rate calculation unit 117 of the simulation unit 110 calculate the operation success rate when the operating machine is operated using the control module 133. Here, if there are a plurality of types of selectable operating machines, the operation success rate calculation unit 117 will calculate the operation success rate for each of the types of operating machines. Accordingly, it is necessary to input, to the control module 133, the first parameter that corresponds to the type of the operating machine.

If there are a plurality of types of selectable operating machines, the selection unit 141 will select the type of operating machine that is to be used, as a real machine, together with the general-purpose control module 133. Note that the selection unit 141 according to the configuration example 2 is an example of a "second selection unit" of the present invention.

3.2 Process Flow

Figure 7:
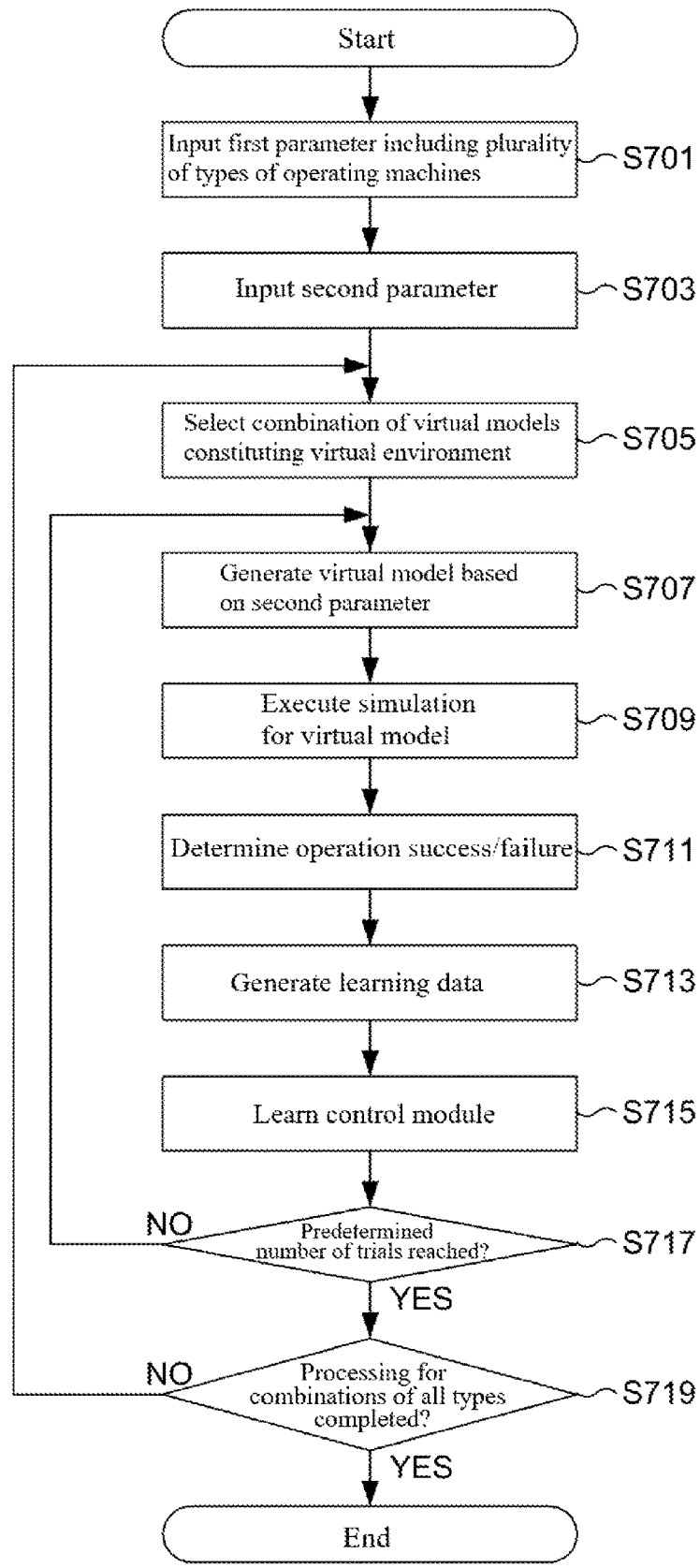
FIG. 7 is a flowchart illustrating an example of a processing procedure of the information processing device according to the embodiment.
Figure 8:
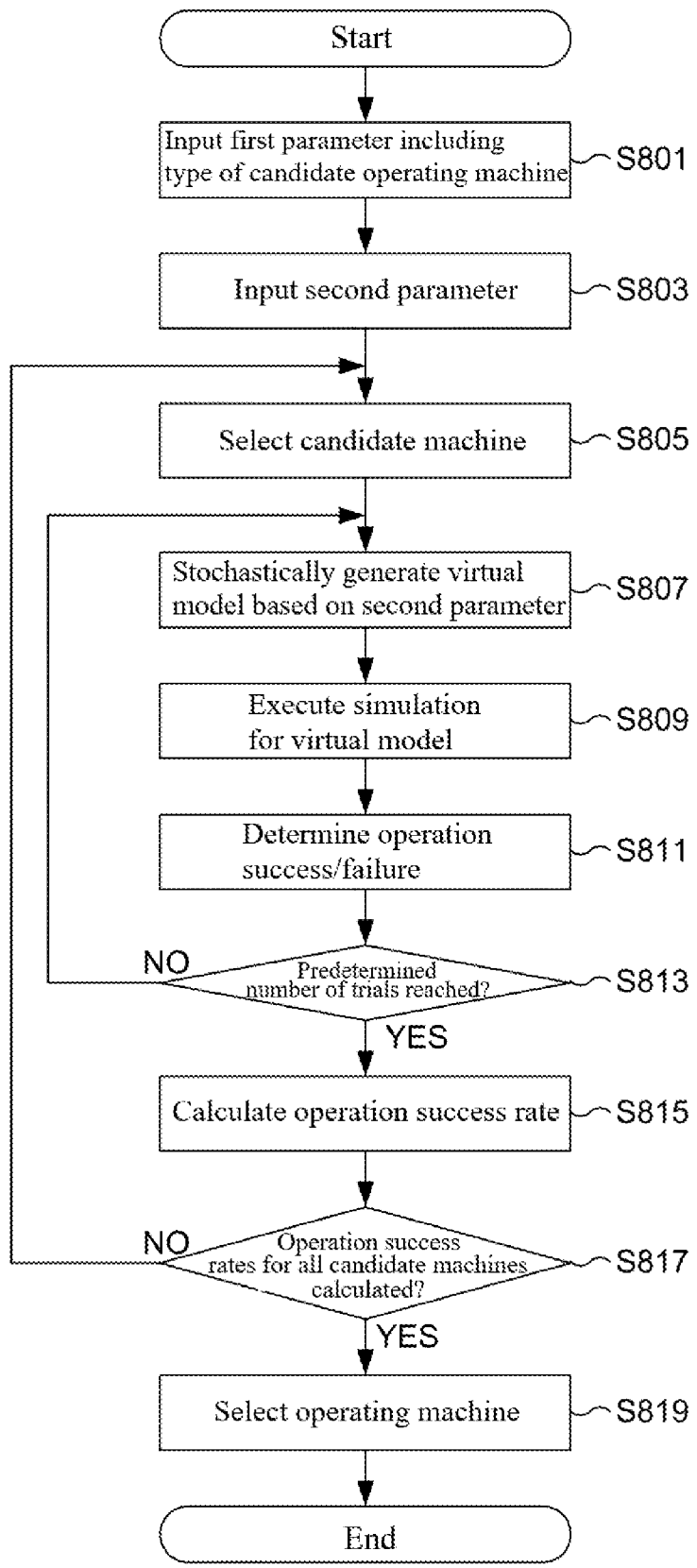
FIG. 8 is a flowchart illustrating an example of a processing procedure of the information processing device according to the embodiment.

The following will describe a flow of processing performed by the information processing device 100 according to the configuration example 2 with reference to FIGS. 7 and 8. FIGS. 7 and 8 are flowcharts showing flows of processing performed by the information processing device 100.

3.2.1 Learning of Control Module 133

First, the flow of processing for learning the general-purpose control module 133 will be described with reference to FIG. 7.

The virtual model type information input unit 101 receives an input of a first parameter that relates to at least one virtual model to be arranged in a virtual environment, the first parameter including information relating to the type of an operating machine (target operating machine) to which the control module 133 is to be applied (step S701). Here, the first parameter can include information relating to a plurality of types for one virtual model (for example, one operating machine) that has the same functionality. Furthermore, the probability information input unit 103 receives an input of a second parameter that relates to a probability distribution with random variables set for a characteristic of a constituent component of each of the plurality of types of virtual models included in the first parameter (step S703).

The simulation unit 110 selects a combination, for use in this trial, including at least one virtual model that constitutes a virtual environment (step S705), and the virtual model generation unit 111 generates each of the virtual models that constitute the selected combination, based on the constituent component having the characteristic stochastically set by the second parameter (step S707). The simulation unit 110 performs a simulation in which the target operating machine is operated in a virtual environment in which the at least one generated virtual model is arranged (step S709). Here, the virtual sensing data generation unit 113 generates, at a suitable point in time during the operation, virtual sensing data, which is a result of detection of the situation of the virtual environment. The operation success/failure determination unit 115 determines whether or not, as a result of such simulation being performed in this way, the operating machine has achieved a preset object, that is, whether or not the operation has been successful (step S711).

The learning data generation unit 121 generates learning data 123 using the determination result (step S713). The learning data 123 can include the first parameter used for the generation of the virtual models, the operation content (control information) of the operating machine, the virtual sensing data, and information relating to an operation success/failure determination result when the operation content and the virtual sensing data are used.

Upon generation of the learning data 123, the control module generation unit 131 uses the learning data 123 to learn the general-purpose control module 133 that can be used by all of the operating machines (step S715).

The simulation unit 110, the learning data generation unit 121, and the control module generation unit 131 repeat such processing from steps S707 to S715 a predetermined number of trials for the combination of the at least one virtual model constituting the virtual environment, until the sufficient number of parameters can be obtained (No in step S717). If a simulation has been performed the sufficient number of trials (Yes in step S717), the simulation unit 110 selects a different combination of virtual models (No in step S719, and S705), and repeats again the processing from steps S707 to S715.

3.2.2 Selection of Operating Machine

The following will describe a flow of processing for selecting, from among a plurality of types of selectable operating machines, a type of operating machine suitable for being applied to a real environment with reference to FIG. 8.

The virtual model type information input unit 101 receives an input of a first parameter relating to one candidate from a plurality of types of operating machines that is selectable when a task is actually executed in a real environment, for example (step S801). Furthermore, the probability information input unit 103 receives an input of a second parameter relating to a probability distribution with random variables set for a characteristic of a constituent component of the virtual model (step S803). The virtual model generation unit 111 generates at least one virtual model of the type designated by the first parameter, based on the constituent component having the characteristic stochastically set by the second parameter (step S807). The simulation unit 110 performs a simulation in which the operating machine that is the selected candidate is operated in a virtual environment in which the at least one generated virtual model is arranged (step S809). At this time, the operating machine is operated based on the control module 133 generated by the control module generation unit 131. At this time, the first parameter used for the generation of the virtual models needs to be designated for the control module 133. Furthermore, the virtual sensing data generation unit 113 generates, at a suitable point in time during the operation, virtual sensing data, which is a result of detection of the situation in the virtual environment. The operation success/failure determination unit 115 determines whether or not, as a result of such simulation being performed in this way, the operating machine has achieved the preset object, that is, whether or not the operation has been successful (step S811).

The simulation unit 110 repeats the processing from steps S807 to S811 a predetermined number of trials for the operating machine of the type selected as a candidate, until the sufficient number of parameters can be obtained (No in step S813). If a simulation has been performed the sufficient number of trials on one type of operating machine (Yes in step S813), the operation success rate calculation unit 117 calculates the operation success rate (step S815).

Then, the simulation unit 110 selects a different operating machine (No in step S817, and S805), and calculates the operation success rate again through the processing from steps S807 to S815. If the operation success rates have been calculated in this way for all of the types of selectable operating machines (Yes in step S817), the selection unit 141 selects the type of the operating machine for actual use based on the operation success rates (step S819). Here, the selection unit 141 only needs to select, for example, the operating machine having the highest operation success rate.

3.3 Effects of Configuration Example 2

As described above, as in the configuration example 1, in the information processing device 100 according to the configuration example 2, upon receiving an input of a second parameter that defines a probability distribution with random variables set for a characteristic of a constituent component of a virtual model, the virtual model is generated that includes the constituent component having the characteristic with variation based on the second parameter, then a simulation is performed in which the operating machine is operated in a virtual environment in which the virtual model is arranged, and the operation result is evaluated. A control module 133 of the operating machine that is robust against variation that may occur in the real environment can be obtained by using the learning data 123 based on the operation result.

Furthermore, a general-purpose control module 133 is generated that can execute appropriate operation by receiving an input of a first parameter that indicates the type of operating machine to be controlled. Since the generated control module 133 is general-purpose, it is conceivable that the control module 133 is applicable to any operating machine even if it was not used at the time of learning for obtaining the control module 133.

Furthermore, similarly, simulations are performed in which operating machines to which the control module 133 is applied are operated in a virtual environment in which virtual models that include a constituent component having a characteristic with variation based on the second parameter, and a result thereof is evaluated. By selecting, from among them, the operating machine with the highest operation success rate, an operating machine can be selected that is robust against variation that may occur in a real environment.

3.4 Modification of Configuration Example 2

Figure 9:
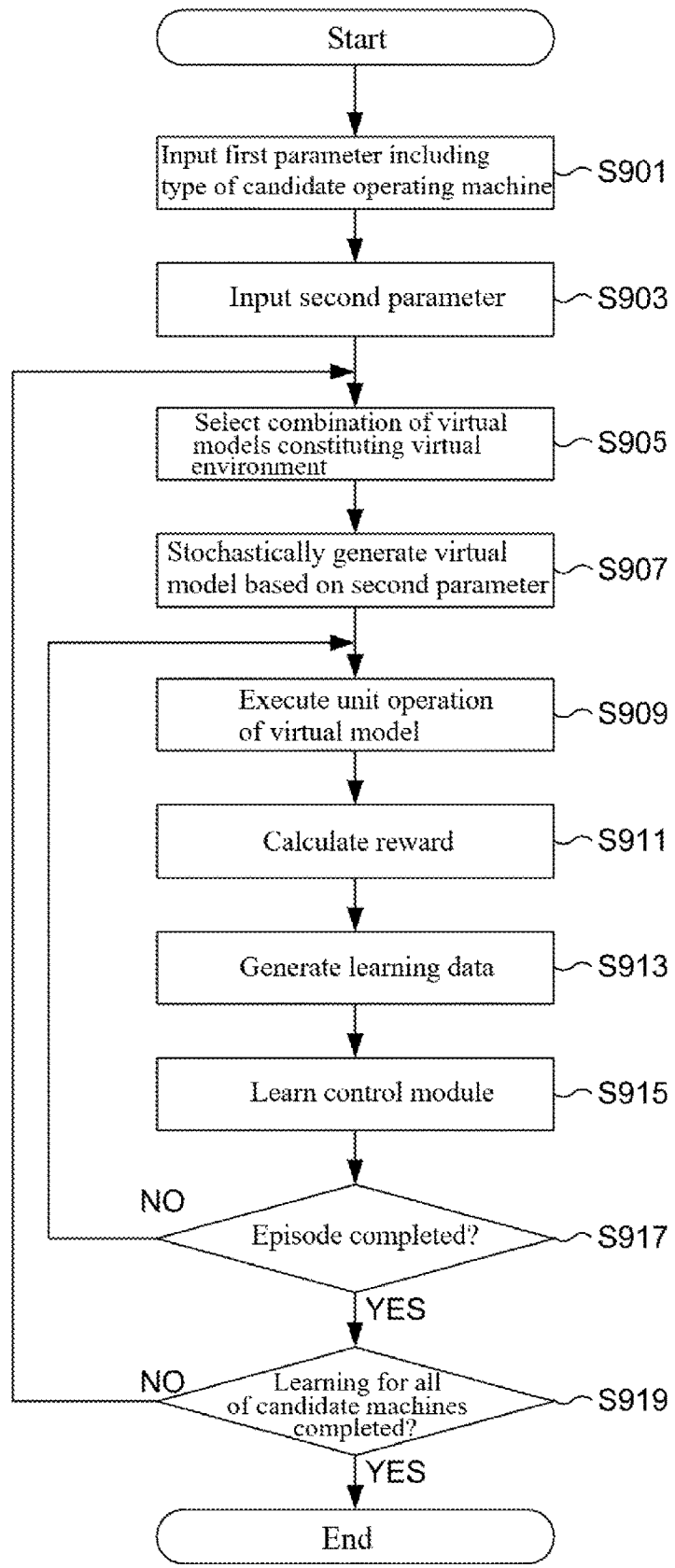
FIG. 9 is a flowchart illustrating an example of a processing procedure of the information processing device according to the embodiment.

Note that, in the above-described configuration example 2, the present invention is applied to a technique for autonomously obtaining a control module of an automated machine using supervised learning, but the present invention is not limited to the supervised learning. For example, as in the application example 1, the present invention is also applicable to a technique for autonomously obtaining a control module of an automated machine using reinforcement learning. The configuration and process flow when the present invention is applied to reinforcement learning are shown in FIG. 9. Basically, the present invention can be realized by a combination of processing that corresponds to at least one of the flow of learning of the control module 133 in the application example 1 as described with reference to FIG. 6, and the flow of learning of the control module in the application example 2 as described with reference to FIG. 7, and thus detailed descriptions will be omitted.

4 ADDITIONAL REMARKS

The foregoing embodiment is provided for easy understanding of the present invention, and is not to be construed as limiting the present invention to the embodiment. The constituent components of the embodiment, and their layout, materials, conditions, shape, sizes, and the like, are not limited to the shown examples, and may be modified as appropriate. Furthermore, configurations shown in different embodiment may be partially replaced or combined.

Additional Remark 1

An information processing device (100) comprising:
a first input unit (101) configured to receive an input of a first parameter for specifying a type of at least one virtual model including a virtual model of an operating machine;
a second input unit (103) configured to receive an input of a second parameter relating to a probability distribution with random variables set for a characteristic of a constituent component of the at least one virtual model;
a virtual model generation unit (111) configured to stochastically generate the at least one virtual model based on the first parameter and the second parameter;
a determination unit (115) configured to determine, when the virtual model of the operating machine is operated in a virtual space that includes the at least one virtual model that is stochastically generated, whether the operation is successful or failed; and
a learning unit (131) configured to generate by learning, based on a success/failure determination result of the operation, a control module (133) for the operating machine to realize a predetermined operation.

Additional Remark 2

The information processing device (100) according to Additional Remark 1,
wherein the learning unit (131) is configured to generate a control module (133) for each of a plurality of operating machines that are generated based on the type specified by the first parameter.

Additional Remark 3

The information processing device (100) according to Additional Remark 1 or 2, further comprising:
a learning data generation unit (121) configured to generate learning data (123) based on a success/failure determination result of the operation and control information of the operating machine used at this time,
wherein the learning unit (131) is configured to generate, using the learning data (123), the control module (133) for the operating machine to realize a predetermined operation.

Additional Remark 4

The information processing device (100) according to Additional remark 3,
wherein the learning data generation unit (121) generates the learning data (123) for each of a plurality of operating machines that are generated based on the type specified by the first parameter, and
the learning unit (131) is configured to generate a control module (133) for each of a plurality of selectable operating machines, by performing learning using the corresponding learning data (123).

Additional Remark 5

The information processing device (100) according to any one of Additional Remarks 2 to 4, further comprising:
a first calculation unit configured to calculate an operation success rate for each of a plurality of combinations of operating machine and control module (133), based on a success/failure determination of the operation when the virtual model of the operating machine to which the corresponding control module (133) is applied is operated in a virtual space that includes the at least one virtual model that is stochastically generated using at least the second parameter; and a first selection unit (141) configured to select a combination of operating machine and control module (133) based on the operation success rates.

Additional Remark 6

The information processing device (100) according to Additional Remark 3,
wherein the learning unit (131) is configured to generate the control module (133) that is applicable to a plurality of types of operating machines by performing learning the learning data (123) obtained based on the plurality of types of operating machines designated by different first parameters as a single control module (133).

Additional Remark 7

The information processing device (100) according to Additional Remark 6, further comprising:
a second calculation unit (117) configured to calculate an operation success rate when the control module (133) is applied to the plurality of types of operating machines, based on a success/failure determination of the operation when the virtual model of the operating machine to which the control module (133) is applied is operated in a virtual space that includes the at least one virtual model that is stochastically generated using at least the second parameter; and
a second selection unit (141) configured to select an operating machine based on the operation success rates.

Additional Remark 8

The information processing device (100) according to Additional Remarks 1 to 7,
wherein the first parameter includes information relating to at least one of a kinematic structure of the operating machine and a shape of the operating machine.

Additional Remark 9

The information processing device (100) according to any one of Additional Remarks 1 to 8,
wherein the second parameter relates to a probability distribution with random variables set for at least one characteristic selected from size, installation position, color, and texture of a constituent component of the operating machine.

Additional Remark 10

The information processing device (100) according to any one of Additional Remarks 1 to 9,
wherein the at least one virtual model includes at least one of a member that affects the surrounding environment of the operating machine, a member that is used together with the operating machine, a sensor for detecting an operation of the operating machine, and a work object of the operating machine, and
the first parameter includes information relating to at least one of a type of the member that affects the surrounding environment of the operating machine, a type of the member that is used together with the operating machine, a type of the sensor for detecting an operation of the operating machine, and a type of the work object of the operating machine.

Additional Remark 11

The information processing device (100) according to Additional Remark 10,
wherein the second parameter relates to a probability distribution with random variables set for at least one characteristic selected from characteristics of the member that affects the surrounding environment of the operating machine, the member that is used together with the operating machine, the sensor for detecting an operation of the operating machine, and the work object of the operating machine.

Additional Remark 12

The information processing device (100) according to any one of Additional Remarks 1 to 11,
wherein the probability distribution of the second parameter includes a combination of a type of a distribution function of continuous values and a value determining a shape of that function, a combination of a distribution function of discrete values and a value determining a shape of that function, and a list of distribution of values.

Additional Remark 13

An information processing method executed by an information processing device (100), the method comprising the steps of:
receiving an input of a first parameter for specifying a type of at least one virtual model including a virtual model of an operating machine;
receiving an input of a second parameter relating to a probability distribution with random variables set for a characteristic of a constituent component of the at least one virtual model;
stochastically generating the at least one virtual model based on the first parameter and the second parameter;
determining, when the virtual model of the operating machine is operated in a virtual space that includes the at least one virtual model that is stochastically generated, whether the operation is successful or failed; and
generating by learning, based on an operation success/failure determination result, a control module (133) for the operating machine to realize a predetermined operation.

Additional Remark 14

A program for causing an information processing device (100) to execute the steps of:
receiving an input of a first parameter for specifying a type of at least one virtual model including a virtual model of an operating machine;
receiving an input of a second parameter relating to a probability distribution with random variables set for a characteristic of a constituent component of the at least one virtual model;
stochastically generating the at least one virtual model based on the first parameter and the second parameter;

determining, when the virtual model of the operating machine is operated in a virtual space that includes the at least one virtual model that is stochastically generated, whether the operation is successful or failed; and generating by learning, based on an operation success/failure determination result, a control module (133) for the operating machine to realize a predetermined operation.

The invention claimed is:

1. An information processing device comprising:
a first input unit configured to receive an input of a first parameter for specifying a type of at least one virtual model including a virtual model of an operating machine;
a second input unit configured to receive an input of a second parameter relating to a probability distribution with random variables set for a characteristic of a constituent component of the at least one virtual model;
a virtual model generation unit configured to stochastically generate the at least one virtual model based on the first parameter and the second parameter;
a determination unit configured to determine, when the virtual model of the operating machine is operated in a virtual space that includes the at least one virtual model that is stochastically generated, whether the operation is successful or failed; and
a learning unit configured to generate by learning, based on a success/failure determination result of the operation, a control module for the operating machine to realize a predetermined operation.

2. The information processing device according to claim 1,
wherein the learning unit is configured to generate a control module for each of a plurality of operating machines that are generated based on the type specified by the first parameter.

3. The information processing device according to claim 1, further comprising:
a learning data generation unit configured to generate learning data based on a success/failure determination result of the operation and control information of the operating machine used at this time,
wherein the learning unit is configured to generate, using the learning data, the control module for the operating machine to realize a predetermined operation.

4. The information processing device according to claim 3,
wherein the learning data generation unit generates the learning data for each of a plurality of operating machines that are generated based on the type specified by the first parameter, and
the learning unit is configured to generate a control module for each of a plurality of selectable operating machines, by performing learning using the corresponding learning data.

5. The information processing device according to claim 2, further comprising:
a first calculation unit configured to calculate an operation success rate for each of a plurality of combinations of operating machine and control module, based on a success/failure determination of the operation when the virtual model of the operating machine to which the corresponding control module is applied is operated in a virtual space that includes the at least one virtual model that is stochastically generated using at least the second parameter; and a first selection unit configured to select a combination of operating machine and control module based on the operation success rates.

6. The information processing device according to claim 3,
wherein the learning unit is configured to generate the control module that is applicable to a plurality of types of operating machines by performing learning the learning data obtained based on the plurality of types of operating machines designated by different first parameters as a single control module.

7. The information processing device according to claim 6, further comprising:
a second calculation unit configured to calculate an operation success rate when the control module is applied to the plurality of types of operating machines, based on a success/failure determination of the operation when the virtual model of the operating machine to which the control module is applied is operated in a virtual space that includes the at least one virtual model that is stochastically generated using at least the second parameter; and
a second selection unit configured to select an operating machine based on the operation success rates.

8. The information processing device according to claim 1,
wherein the first parameter includes information relating to at least one of a kinematic structure of the operating machine and a shape of the operating machine.

9. The information processing device according to claim 1,
wherein the second parameter relates to a probability distribution with random variables set for at least one characteristic selected from size, installation position, color, and texture of a constituent component of the operating machine.

10. The information processing device according to claim 1,
wherein the at least one virtual model includes at least one of a member that affects the surrounding environment of the operating machine, a member that is used together with the operating machine, a sensor for detecting an operation of the operating machine, and a work object of the operating machine, and
the first parameter includes information relating to at least one of a type of the member that affects the surrounding environment of the operating machine, a type of the member that is used together with the operating machine, a type of the sensor for detecting an operation of the operating machine, and a type of the work object of the operating machine.

11. The information processing device according to claim 10,
wherein the second parameter relates to a probability distribution with random variables set for at least one characteristic selected from characteristics of the member that affects the surrounding environment of the operating machine, the member that is used together with the operating machine, the sensor for detecting an operation of the operating machine, and the work object of the operating machine.

12. The information processing device according to claim 1,
wherein the probability distribution of the second parameter includes a combination of a type of a distribution function of continuous values and a value determining a shape of that function, a combination of a distribution function of discrete values and a value determining a shape of that function, and a list of distribution of values.

13. An information processing method executed by an information processing device the method comprising the steps of:
receiving an input of a first parameter for specifying a type of at least one virtual model including a virtual model of an operating machine;
receiving an input of a second parameter relating to a probability distribution with random variables set for a characteristic of a constituent component of the at least one virtual model;
stochastically generating the at least one virtual model based on the first parameter and the second parameter;
determining, when the virtual model of the operating machine is operated in a virtual space that includes the at least one virtual model that is stochastically generated, whether the operation is successful or failed; and
generating by learning, based on an operation success/failure determination result, a control module for the operating machine to realize a predetermined operation.

14. A non-transitory computer-readable storage medium recording a program for causing an information processing device to execute the steps of:
receiving an input of a first parameter for specifying a type of at least one virtual model including a virtual model of an operating machine;
receiving an input of a second parameter relating to a probability distribution with random variables set for a characteristic of a constituent component of the at least one virtual model;
stochastically generating the at least one virtual model based on the first parameter and the second parameter;
determining, when the virtual model of the operating machine is operated in a virtual space that includes the at least one virtual model that is stochastically generated, whether the operation is successful or failed; and
generating by learning, based on an operation success/failure determination result, a control module for the operating machine to realize a predetermined operation.

* * * * *